US012749173B2

(12) United States Patent
Wang et al.

(10) Patent No.: US 12,749,173 B2
(45) Date of Patent: Sep. 29, 2026

(54) DETECTION METHOD FOR SPINNING WORKSHOP, ELECTRONIC DEVICE AND STORAGE MEDIUM

(71) Applicant: ZHEJIANG HENGYI PETROCHEMICAL CO., LTD., Hangzhou (CN)

(72) Inventors: Peng Wang, Zhejiang (CN); Xiantao Peng, Zhejiang (CN); Yibo Qiu, Zhejiang (CN); Mingyi Liu, Zhejiang (CN); Dake Li, Zhejiang (CN); Junliang Jin, Zhejiang (CN); Feng Xu, Zhejiang (CN); Haifeng Wang, Zhejiang (CN)

(73) Assignee: ZHEJIANG HENGYI PETROCHEMICAL CO., LTD., Hangzhou (CN)

( * ) Notice: Subject to any disclaimer, the term of this patent is extended or adjusted under 35 U.S.C. 154(b) by 181 days.

(21) Appl. No.: 18/934,120

(22) Filed: Oct. 31, 2024

(65) Prior Publication Data

US 2025/0217957 A1 Jul. 3, 2025

Related U.S. Application Data

(63) Continuation of application No. 18/807,606, filed on Aug. 16, 2024, now Pat. No. 12,229,939.

(30) Foreign Application Priority Data

Dec. 27, 2023 (CN) ......................... 202311823451.0

(51) Int. Cl.
*G06T 7/00* (2017.01)
*G06V 10/26* (2022.01)
(Continued)

(52) U.S. Cl.
CPC ............ *G06T 7/0004* (2013.01); *G06V 10/26* (2022.01); *G06V 10/40* (2022.01); *G06V 10/764* (2022.01);
(Continued)

(58) Field of Classification Search
CPC ......... G06T 7/0004; G06T 2207/10048; G06T 2207/20081; G06T 2207/30108;
(Continued)

(56) References Cited

U.S. PATENT DOCUMENTS

2022/0027563 A1 1/2022 Zhicharevich et al.

FOREIGN PATENT DOCUMENTS

CN 110060237 A 7/2019
CN 113570500 A 10/2021
(Continued)

OTHER PUBLICATIONS

First Office Action received in Chinese Application No. 202311823451.0, dated Mar. 22, 2024.
(Continued)

*Primary Examiner* — Samir A Ahmed
(74) *Attorney, Agent, or Firm* — Knobbe, Martens, Olson & Bear, LLP

(57) ABSTRACT

Provided is a detection method for a spinning workshop, an electronic device and a storage medium; relating to the field of data processing. The method includes: performing image collection on a process control device of a spinning box in the spinning workshop to obtain an image to be processed; extracting a first image feature from the image to be processed; and processing the first image feature based on a decoder network to obtain a fault detection result. The decoder network comprises a plurality of decoder modules connected in series in sequence. Each decoder module includes a decoder layer and an adaptive classification head.
(Continued)

The adaptive classification head is configured to perform classified prediction on an output feature of the decoder layer to obtain a first fault classification result. The fault detection result output by the decoder network includes a second fault classification result and a fault position.

20 Claims, 6 Drawing Sheets

(51) Int. Cl.
*G06V 10/40* (2022.01)
*G06V 10/764* (2022.01)
*G06V 10/77* (2022.01)
*G06V 10/80* (2022.01)
*G06V 20/50* (2022.01)

(52) U.S. Cl.
CPC ........ *G06V 10/7715* (2022.01); *G06V 10/806* (2022.01); *G06V 20/50* (2022.01); *G06T 2207/10048* (2013.01); *G06T 2207/20081* (2013.01); *G06T 2207/30108* (2013.01); *G06V 2201/06* (2022.01)

(58) Field of Classification Search
CPC ...... G06V 10/26; G06V 10/40; G06V 10/764; G06V 10/7715; G06V 10/806; G06V 20/50; G06V 2201/06; G06V 20/52; G06V 10/82; Y02P 90/02
See application file for complete search history.

(56) References Cited

FOREIGN PATENT DOCUMENTS

| | | | | |
|---|---|---|---|---|
| CN | 113899574 | | 1/2022 | |
| CN | 11402242 A | | 2/2022 | |
| CN | 115016965 A | | 9/2022 | |
| CN | 115031313 A | * | 9/2022 | ............. G05B 11/42 |
| CN | 115294345 A | | 11/2022 | |
| CN | 115941530 A | | 4/2023 | |
| CN | 116206171 A | | 6/2023 | |
| CN | 116433898 A | | 7/2023 | |
| CN | 116777839 A | | 9/2023 | |
| CN | 116796159 A | | 9/2023 | |
| CN | 116797977 A | | 9/2023 | |
| CN | 116895009 | | 10/2023 | |
| CN | 117236390 A | | 12/2023 | |
| CN | 117278722 A | * | 12/2023 | ............. G06V 20/52 |
| CN | 117292277 A | | 12/2023 | |
| JP | H02131662 A | | 5/1990 | |
| JP | 2021-177380 | | 11/2021 | |
| KR | 20200087297 A | | 7/2020 | |
| WO | WO 2023024412 A1 | | 3/2023 | |
| WO | WO 2023092759 A1 | | 6/2023 | |
| WO | WO 2023193428 A1 | | 10/2023 | |
| WO | WO 2023241410 A1 | | 12/2023 | |

OTHER PUBLICATIONS

Notification to Grant Patent Right for Invention received in Chinese Application No. 202311823451.0, dated Apr. 15, 2024.
Yanwei, P. et al. "Lane Semantic Segmentation Neural Network Based on Edge Feature Merging and Skip Connections," Journal of Tianjin University (Science and Technology), vol. 53 No. 8, Aug. 2019.
Yao, Y. et al. "Research on Structured Image Annotation Based on Deep Learning," Computer Knowledge and Technology, vol. 15 No. 33, Nov. 2019.
Extended European Search Report issued in EP Application No. 24195196.1 on Feb. 10, 2025.
Decision to Grant issued in JP Application No. 2024-230195 on Jan. 28, 2025.

* cited by examiner

DETECTION METHOD FOR SPINNING WORKSHOP, ELECTRONIC DEVICE AND STORAGE MEDIUM

CROSS-REFERENCE TO RELATED APPLICATIONS

The present application is a continuation application of U.S. patent application Ser. No. 18/807,606 filed on Aug. 16, 2024, which claims priority to Chinese Patent Application No. CN202311823451.0, filed with the China National Intellectual Property Administration on Dec. 27, 2023, the disclosure of each of which is hereby incorporated herein by reference in its entirety.

TECHNICAL FIELD

The present disclosure relates to the field of data processing, and in particular to the fields of artificial intelligence, computer vision and other technologies.

BACKGROUND

In the industrial scene of spinning process, the spinning box in the spinning workshop plays a vital role in the process of producing chemical fiber products. However, the efficiency of manual inspection of the spinning box is low. Therefore, how to efficiently inspect the spinning workshop is a problem currently faced.

SUMMARY

The present disclosure provides a detection method and apparatus for a spinning workshop, an electronic device and a storage medium, to solve or alleviate one or more technical problems in the related art.

In a first aspect, the present disclosure provides a detection method for a spinning workshop, including:

- performing image collection on a process control device of a spinning box in the spinning workshop to obtain an image to be processed;
- extracting a first image feature from the image to be processed; and
- processing the first image feature based on a decoder network to obtain a fault detection result for the process control device;
- where the decoder network includes a plurality of decoder modules connected in series in sequence;
- for each decoder module: the decoder module includes a decoder layer and an adaptive classification head; and the adaptive classification head is configured to perform classified prediction on an output feature of the decoder layer to obtain a first fault classification result, and update the first fault classification result based on a preset classification calibration matrix to obtain a second fault classification result output by the decoder module; and
- the fault detection result output by the decoder network includes a second fault classification result output by a last-layer decoder module of the decoder network, and a fault position output by the last-layer decoder module.

In a second aspect, the present disclosure provides a detection apparatus for a spinning workshop, including:

- a collection unit configured to perform image collection on a process control device of a spinning box in the spinning workshop to obtain an image to be processed;
- an extraction unit configured to extract a first image feature from the image to be processed; and
- a processing unit configured to process the first image feature based on a decoder network to obtain a fault detection result for the process control device;
- where the decoder network includes a plurality of decoder modules connected in series in sequence;
- for each decoder module: the decoder module includes a decoder layer and an adaptive classification head; and the adaptive classification head is configured to perform classified prediction on an output feature of the decoder layer to obtain a first fault classification result, and update the first fault classification result based on a preset classification calibration matrix to obtain a second fault classification result output by the decoder module; and
- the fault detection result output by the decoder network includes a second fault classification result output by a last-layer decoder module of the decoder network, and a fault position output by the last-layer decoder module.

In a third aspect, provided is an electronic device, including:

- at least one processor; and
- a memory connected in communication with the at least one processor;
- where the memory stores an instruction executable by the at least one processor, and the instruction, when executed by the at least one processor, enables the at least one processor to execute the method of any embodiment of the present disclosure.

In a fourth aspect, provided is a non-transitory computer-readable storage medium storing a computer instruction thereon, and the computer instruction is used to cause a computer to execute the method of any embodiment of the present disclosure.

In a fifth aspect, provided is a computer program product including a computer program, and the computer program implements the method of any embodiment of the present disclosure, when executed by a processor.

In the embodiments of the present disclosure, the spinning box in the spinning workshop can be monitored automatically so as to timely discover the fault area and the fault type.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

In the accompanying drawings, the same reference numbers represent the same or similar parts or elements throughout the accompanying drawings, unless otherwise specified. These accompanying drawings are not necessarily drawn to scale. It should be understood that these accompanying drawings only depict some embodiments provided according to the present disclosure, and should not be considered as limiting the scope of the present disclosure.

DETAILED DESCRIPTION

Figure 1:
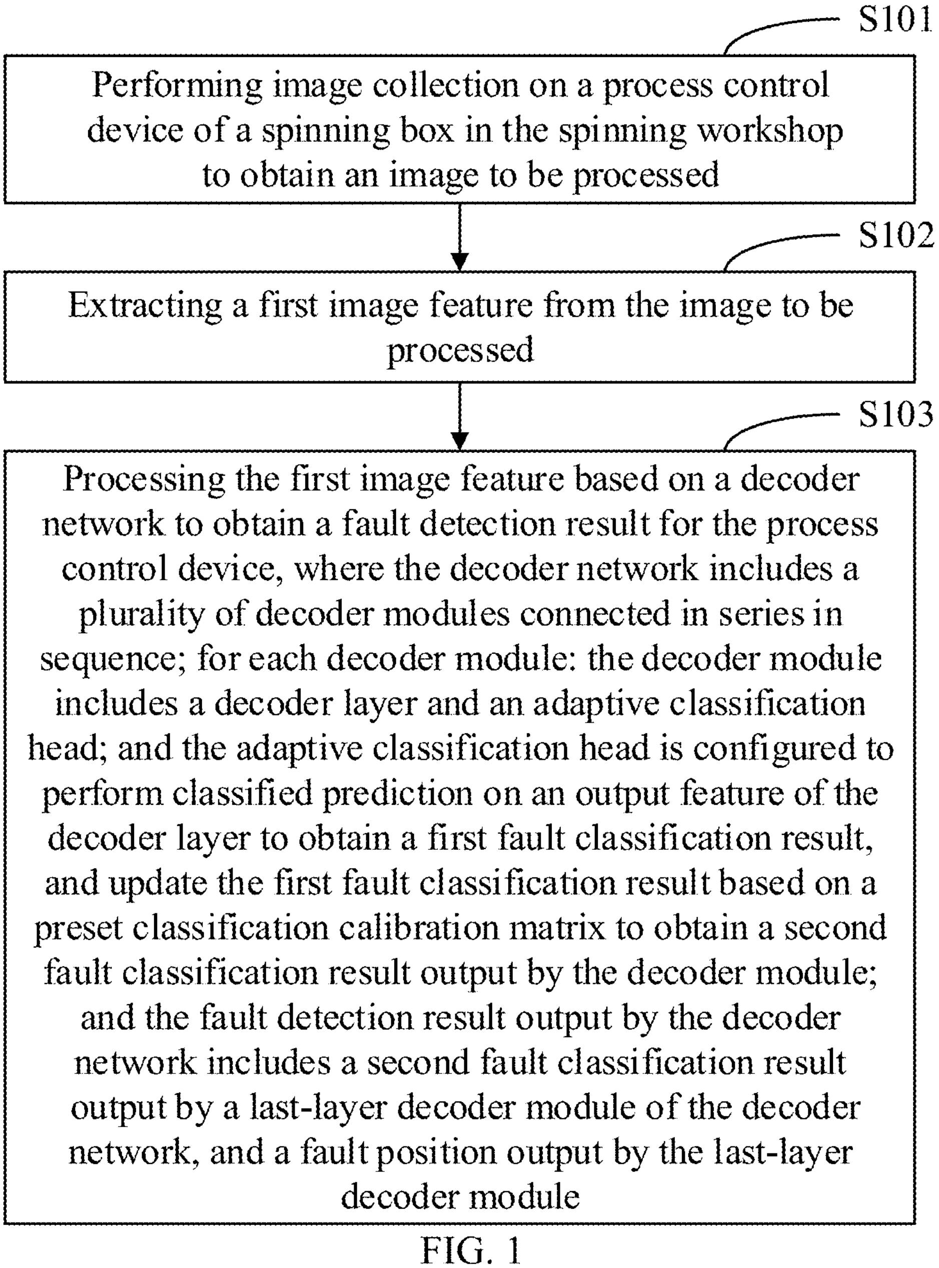
FIG. 1 is a schematic flowchart of a detection method for a spinning workshop according to an embodiment of the present disclosure.

The present disclosure will be described below in detail with reference to the accompanying drawings. The same reference numbers in the accompanying drawings represent elements with identical or similar functions. Although various aspects of the embodiments are shown in the accompanying drawings, the accompanying drawings are not necessarily drawn to scale unless specifically indicated.

In addition, in order to better illustrate the present disclosure, numerous specific details are given in the following specific implementations. Those having ordinary skill in the art should understand that the present disclosure may be performed without certain specific details. In some examples, methods, means, elements and circuits well known to those having ordinary skill in the art are not described in detail, in order to highlight the subject matter of the present disclosure.

Moreover, the terms "first" and "second" are only for the purpose of description, and cannot be construed to indicate or imply the relative importance or implicitly point out the number of technical features indicated. Therefore, the feature defined with "first" or "second" may explicitly or implicitly include one or more features. In the description of the present disclosure, "a plurality of" means two or more than two, unless otherwise expressly and specifically defined.

In the industrial scene of spinning process, the spinning box in the spinning workshop plays a vital role in the process of producing chemical fiber products. The important components of the spinning box include a spinning assembly and a process control device on the back of the spinning assembly. In an embodiment of the present disclosure, the key components of the process control device include a heating device, a melt distribution pipe, an auxiliary material delivery pipe, a metering pump, etc. Here, the melt distribution pipe has a heat preservation layer, and the heating device needs to ensure the temperature of the melt in the melt distribution pipe so as to distribute the melt into the metering pump. The metering pump evenly distributes the melt to each component of the spinning box, and a thin melt flow is formed through a fine hole of the spinneret plate in the spinning assembly. After flowing out of the spinneret plate, the thin melt flow is naturally cooled to form the yarn.

Here, the heat preservation is required for the melt in the piping of the spinning box, to ensure the uniform temperature as much as possible.

The embodiments of the present disclosure mainly relate to the fault detection for the process control device on the back of the spinning assembly, and especially to the detection for the heating device, melt distribution pipe and auxiliary material delivery pipe. For ease of description and understanding, the heating device and the melt distribution pipe are collectively referred to as a temperature control system in the embodiments of the present disclosure.

In addition, the embodiments of the present disclosure can also detect the open area on the back of the spinning assembly, etc., so as to improve the detection efficiency of the spinning workshop.

It should be noted that the main types of spinning products involved in the solution of the embodiments of the present disclosure may include one or more of Partially Oriented Yarns (POY), Fully Drawn Yarns (FDY), Polyester staple fiber, etc. For example, the types of yarns may specifically include Polyester Partially Oriented Yarns, Polyester Fully Drawn Yarns, Polyester Drawn Yarns, Polyester staple fiber, etc.

In order to automatically and accurately detect the spinning workshop, an embodiment of the present disclosure proposes a detection method for the spinning workshop by means of a DETR (DEtection Transformer), as shown in FIG. 1, including:

S101: performing image collection on a process control device of a spinning box in the spinning workshop to obtain an image to be processed.

Figure 2:
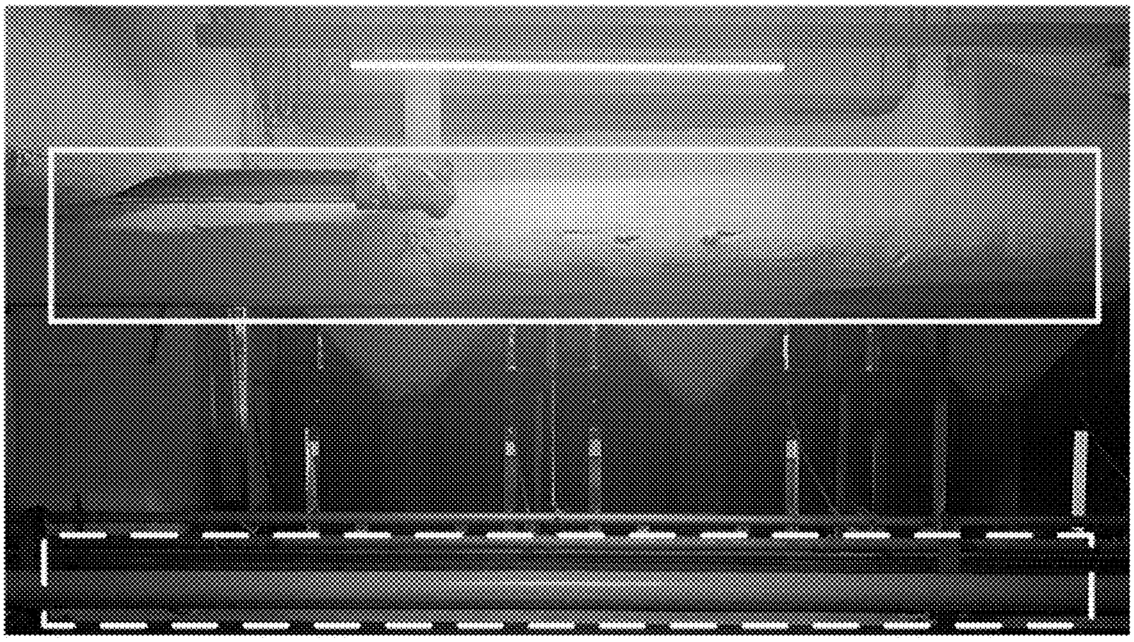
FIG. 2 is a schematic diagram of an image to be processed according to an embodiment of the present disclosure.

Here, a drone may be used to perform image collection the process control device of the spinning box in the spinning workshop. The process control device may include a temperature control system and an auxiliary material delivery pipe. The collected image to be processed may be shown in FIG. 2. The pipe in the white solid line frame is a melt distribution pipe in the temperature control system, and the outer layer of the melt distribution pipe is wrapped with a heat preservation layer. The melt distribution pipe is used to transport the melt produced by the final polycondensation reactor from the pipeline to a metering pump and then evenly distribute the melt to the spinning components of the spinning box for processing. Since the heat preservation is required for the melt distribution pipe, it is necessary to capture an image of the melt distribution pipe during inspection to determine whether the heat preservation layer is damaged, thereby further ensuring the temperature of the melt distribution pipe. The auxiliary material delivery pipe is within the white dotted frame, and is used to transport industrial auxiliary materials.

Figure 3:
FIG. 3 is another schematic diagram of an image to be processed according to an embodiment of the present disclosure.

The image to be processed may also be shown in FIG. 3, in which the heating device in the temperature control system is shown in the white solid line rectangular frame. The heating device needs to keep a safety door closed in the working process.

S102: extracting a first image feature from the image to be processed.

S103: processing the first image feature based on a decoder network to obtain a fault detection result for the process control device.

Here, the decoder network includes a plurality of decoder modules connected in series in sequence; for each decoder module: the decoder module includes a decoder layer and an adaptive classification head; and the adaptive classification head is configured to perform classified prediction on an output feature of the decoder layer to obtain a first fault classification result, and update the first fault classification result based on a preset classification calibration matrix to obtain a second fault classification result output by the decoder module. The fault detection result output by the decoder network includes a second fault classification result output by a last-layer decoder module of the decoder network, and a fault position output by the last-layer decoder module.

Figure 4:
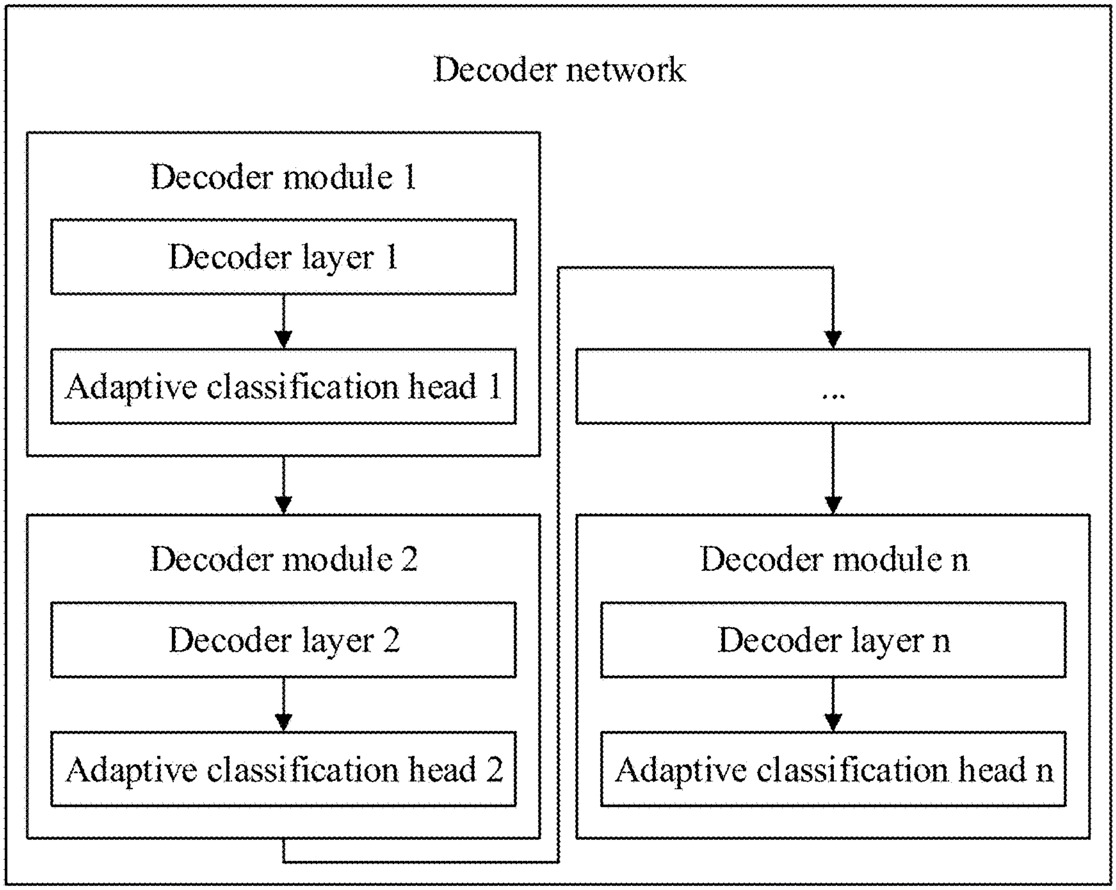
FIG. 4 is a schematic diagram of a decoder network according to an embodiment of the present disclosure.

Here, the decoder network may be as shown in FIG. 4, n decoder modules are shown, and n is a positive integer. In FIG. 4, the decoder module 1, decoder module 2, . . . , decoder module n are connected in series in sequence. The decoder module 1 includes a decoder layer 1 and an adaptive classification head 1, and each decoder layer may include a self-attention module and a cross-attention module connected after the self-attention module (not shown in the figure). For each decoder module after the first decoder module in the decoder network: a query vector (Q), a key vector (K) and a value vector (V) required in the decoder module are constructed based on the output features output by the previous decoder module of the decoder module. The adaptive classification head 1 is connected in series below the decoder layer 1, and the adaptive classification head 1 is configured to perform classified prediction on an output feature of the decoder layer 1 to obtain a first fault classification result, and update the first fault classification result based on a preset classification calibration matrix to obtain a second fault classification result output by the decoder module. That is, each decoder module has the basically same structure, and will obtain the respective first fault classification result and second fault classification result.

When all the n decoder modules have been processed, the second fault classification result output by the last-layer decoder module of the decoder network is obtained.

The first fault classification result may be expressed as $$p_i^L, \text{ where } P_i^L$$

represents the classification prediction of the decoder layer L in the $L^{th}$ layer belonging to the $i^{th}$ classification, and L is a positive integer greater than or equal to 1 and less than or equal to n. Assuming that the preset classification calibration matrix of the decoder layer L is $$s_i^L,$$

the update method of updating the first fault classification result is as shown in expression (1):

$$p_i^L = \text{Sigmoid}\left(t_i^L + s_i^L\right),\ t_i^L = MLP_{cls}\left(Q_i^L\right) \tag{1}$$

Here, $$s_i^L$$

in the preset classification calibration matrix is a set of learnable deviation vectors $$s_i^L = \{s_1^L, s_2^L, \ldots, s_m^L\};$$

m means that there are m fault classifications in total, and $$Q_i^L$$

represents the output feature output by the decoder layer L.

In the embodiment of the present disclosure, the decoder network is constructed based on the Transformer network structure.

In the embodiment of the present disclosure, the decoder network includes a plurality of decoder modules connected in series in sequence; each decoder module includes a decoder layer and an adaptive classification head; and the adaptive classification head is configured to perform classified prediction on an output feature of the decoder layer to obtain a first fault classification result. The method of using the adaptive classification head aims to calibrate the prediction result of each layer based on the adaptive classification head to improve the detection performance. In the embodiment of the present disclosure, the image collection is performed on the back side of the spinning box in the spinning workshop to obtain the image to be processed, and then the first image feature is extracted from the image to be processed, and the first image feature is processed based on the decoder network to obtain the fault detection result for the process control device. This method can automatically monitor the spinning box in the spinning workshop, so as to timely discover the fault area and the fault type.

The overall flow in the embodiment of the present disclosure is divided into three parts: obtaining the first image feature, optimizing the decoder network, and obtaining the fault detection result. These three parts will be described in detail below:

1) Obtaining the First Image Feature

In some embodiments, the step of extracting the first image feature from the image to be processed may be implemented as follows:

Step A1: inputting the image to be processed into a backbone network to obtain an initial image feature.

The backbone networks that can be used include, for example, vggnet (Visual Geometry Group Net), resnet (residual network) and inception network, etc. Of course, the embodiments of the present disclosure do not impose too many limitations on the specific backbone network.

Step A2: inputting the initial image feature into an encoder network to obtain the first image feature.

Here, the encoder network may be a Transformer encoder.

After the first image feature is obtained, the first image feature may be further decoded in combination with a default initial query feature $$Q_0 = \{Q_1^0, Q_2^0, \ldots, Q_n^0\}.$$

This initial query feature $Q_0$ will be iteratively updated with the subsequent decoder network.

In the embodiment of the present disclosure, the backbone network and the encoder network are used to perform feature extraction on the image to be processed, so that the first image feature for fault detection can be accurately obtained.

In some embodiments, as described above, the temperature control of the heat preservation layer is relatively important for the spinning process. Therefore, in an embodiment of the present disclosure, when a thermal image of the spinning workshop is collected by an infrared camera, the step of extracting the first image feature from the image to be processed may also be implemented as follows:

Step B1: inputting the image to be processed into an everything segmentation model to obtain a mask image of a target position.

Figure 5:
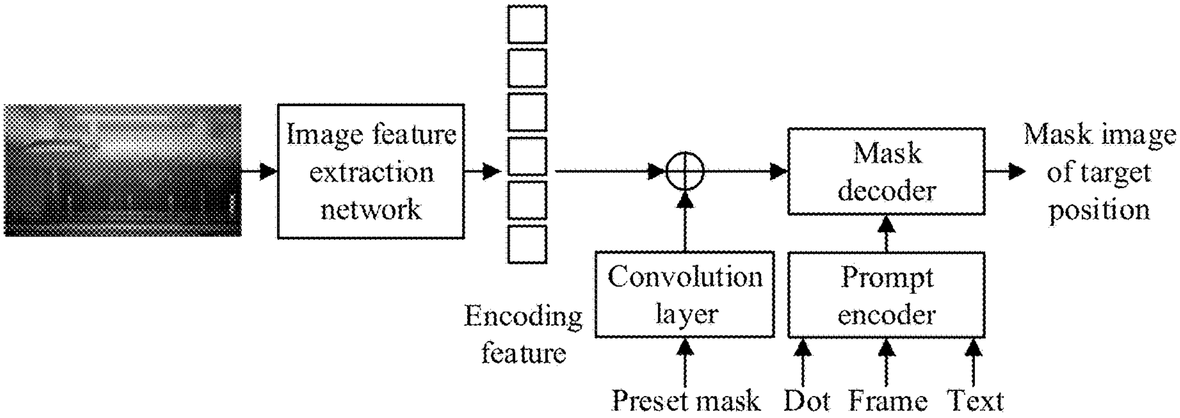
FIG. 5 is a schematic diagram of obtaining a mask image according to an embodiment of the present disclosure.

Here, a schematic diagram of inputting the image to be processed into the everything segmentation model may be shown in FIG. 5. The image to be processed is input into an image feature extraction network to obtain an encoding feature. The preset mask is convolved using at least one convolution layer to obtain a mask feature. The preset mask may be a dot-based or frame-based mask, or may be a mask obtained by object segmentation based on other segmentation networks. The mask feature and the encoding feature are fused and then input into a mask decoder. At the same time, the prompt information (including at least one of dot, frame and text) is also input into the mask decoder. After processing by the mask decoder, the mask image of the target position can be obtained. In an embodiment of the present disclosure, the target position may be a damaged position in the heat preservation layer.

During implementation, an image sample of the damaged position of the heat preservation layer may be collected in advance. A damage position feature is constructed based on the image sample. For example, the pixel value at the damaged position may be statistically analyzed to obtain the pixel value distribution as the damaged position feature. The pixel value distribution may be expressed by the number of pixels in different pixel value intervals. For another example, the feature extraction may be performed on the damaged position to obtain the damaged position feature.

In an embodiment of the present disclosure, a drone is controlled to collect images at fixed points on a specified inspection path. That is, for the same detection area in the process control device of the spinning box, the contents of the images collected successively are basically similar. Therefore, a plurality of candidate detection frames may be pre-marked for the images to be processed that are collected in the same detection area in the embodiment of the present disclosure. For each image to be processed, pixel dots or pixel frames are screened from each candidate detection frame based on the damaged position feature, to thereby construct the prompt information of the everything segmentation model.

Specifically, when the damaged position feature is pixel value distribution, a plurality of pixel dots may be obtained according to the m neighborhood starting from any dot in the candidate detection frame, and then the distribution of pixels to be compared is statistically obtained. The pixels to be compared are respectively matched with the damaged position feature to calculate the matching degree. When the matching degree is higher than a threshold, the dots and/or frames in the prompt information of the everything segmentation model are obtained. m is a positive integer.

When the damaged position feature is obtained through feature extraction, the feature extraction may be performed on the candidate detection frame to obtain a feature to be compared, and the feature to be compared is matched with the damaged position feature. When the matching degree is higher than a threshold, the dots and/or frames in the prompt information of the everything segmentation model are obtained.

Step B2: generating a minimum rectangular bounding box to accommodate the mask image of the target position based on the mask image of the target position.

It can be understood that the dots and frames in the pre-constructed prompt information roughly determine the damage position. Through the everything segmentation model, the damaged position can be improved and optimized with the help of the prompt information, to thereby obtain the more accurate mask image.

In order to increase the accuracy of fault detection, the features of the target position will be described from multiple levels in the embodiment of the present disclosure, specifically as shown in step B3 to step B7.

Step B3: cutting out a visible sub-image from the image to be processed based on the minimum rectangular bounding box, and cutting out a thermal sub-image within the minimum rectangular bounding box from a thermal image with a same viewing range as the image to be processed.

Step B4: inputting the visual sub-image into a backbone network to obtain a first sub-image feature.

Step B5: inputting the first sub-image feature into an encoder network to obtain a sub-image feature to be fused.

Step B6: extracting a thermal feature from the thermal sub-image.

It should be noted that step B6 can be executed at a proper time and is not limited to being executed after step B5.

Here, the Long Short-Term Memory (LSTM) network may be used to process the thermal sub-image to obtain the thermal feature. For example, the drone may be controlled to follow the same inspection route and collect images at fixed points. The range of views during image collection is almost the same. Therefore, the objects contained in a plurality of images at the same location are almost the same during multiple inspections. The image content in the minimum rectangular bounding box in a plurality of thermal images within a preset duration may be obtained to obtain a thermal sub-image sequence, and then a change trend feature of the temperature is extracted based on the LSTM as the thermal feature.

Step B7: fusing the sub-image feature to be fused, the thermal feature, and a second sub-image feature extracted by the everything segmentation model from the minimum rectangular bounding box of the image to be processed, to obtain the first image feature.

Here, the fusion method may be weighting fusion, splicing fusion, etc.

In the embodiment of the present disclosure, the image to be processed may be processed using the everything segmentation model, to obtain the mask image of the target position and thus obtain the visible sub-image. The visual sub-image is input into the backbone network and the encoder network to obtain the sub-image feature to be fused, and the thermal sub-image of the visual sub-image is obtained based on the visual sub-image, and then the thermal feature of the thermal sub-image is extracted; the sub-image feature to be fused, the thermal feature, and the second sub-image feature extracted by the everything segmentation model from the minimum rectangular bounding box of the image to be processed are fused to obtain the first image feature. Based on this method, the first image feature can be extracted from multiple dimensions, and especially the thermal feature can describe the temperature change trend of the target position, laying a strong foundation for subsequently obtaining the fault detection result.

2) Optimizing the Decoder Network

Figure 6:
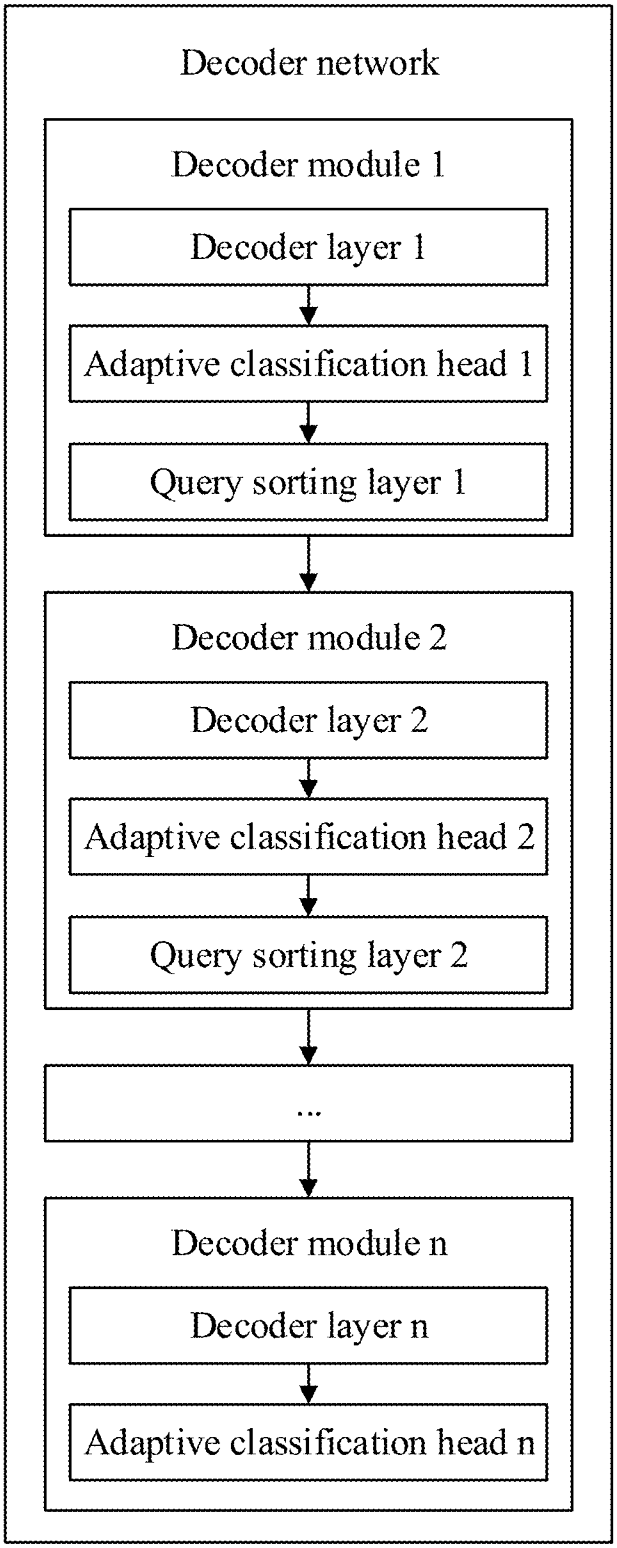
FIG. 6 is another schematic diagram of the decoder network according to an embodiment of the present disclosure.

In order to further improve the accuracy of detection, a query sorting layer may also be added to optimize the decoder network based on FIG. 4. As shown in FIG. 6, the decoder module 1, decoder module 2, . . . , decoder module n are connected in series in sequence. At least one decoder module other than the last-layer decoder module includes a decoder layer, an adaptive classification head and a query sorting layer. In the decoder module, the decoder layer 1 is connected in series with the adaptive classification head 1, and the adaptive classification head 1 is connected in series with the query sorting layer 1. Then the structures in the decoder module 2 are connected in series in sequence, and so on. Each decoder layer may include a self-attention module and a cross-attention module connected after the self-attention module (not shown in the figure). When the decoder network includes n decoder modules, the query vector is adjusted through n iterations.

In an embodiment of the present disclosure, in order to give full play to the advantage of sorting, the query vector of each decoder module is defined to be composed of two parts: a first sub-feature $$Q_c^L = Q_{c,1}^L, Q_{c,2}^L, \ldots, Q_{c,n}^L$$

and a second sub-feature $$Q_q^L = Q_{q,1}^L, Q_{q,2}^L, \ldots, Q_{q,n}^L.$$

The first sub-feature is used to capture the semantic category information; and the second sub-feature is used to encode the location information of the fault, such as the distribution of the center and size of the bounding box.

The manner to update the two sub-features in the query vector will be illustrated below, specifically including:

1. Update the First Sub-Feature

As described above, the query vector of each decoder module includes a first sub-feature; at least one decoder module other than the first decoder module in the decoder network further includes a query sorting layer; and for a decoder module including the query sorting layer, the decoder module updates the first sub-feature of the decoder module based on the following method:

Step C1: processing a first element in the first sub-feature of the decoder module in descending order based on the second fault classification result output by the decoder module, to obtain a first intermediate feature.

Here, the first intermediate feature of the decoder module in the L−1$^{th}$ layer is as shown in expression (2):

$$\hat{Q}_c^{L-1} = \text{Sort}\left(Q_c^{L-1}; p^{L-1}\right) \tag{2}$$

Here, $$\hat{Q}_c^{L-1}$$

is the first intermediate feature of the decoder module in the L−1$^{th}$ layer; $p^{L-1}$ is the second fault classification result output by the decoder module in the L−1$^{th}$ layer;

$$Q_c^{L-1}$$

is the first sub-feature, and each element in the first sub-feature can be respectively referred to as the first element.

Each decoder module not only outputs the second fault classification result, but also outputs w detection frames, where w is a positive integer. Correspondingly, the first sub-feature includes w elements, and each element in the first sub-feature corresponds to one detection frame. $p^{L-1}$ also includes w elements, each element corresponds to the fault classification result of one detection frame, and there are m preset fault types. The fault classification result of any detection frame is the probability distribution {m1, m2, . . . , mm} for each preset fault type, where m1 represents the probability that the detection frame belongs to the fault type 1; and m2 represents the probability that the detection frame belongs to the fault type 2. The maximum probability in the fault classification result of the detection frame is used to sort the elements in the first sub-feature in descending order.

Step C2: splicing the first intermediate feature with a preset content calibration matrix to obtain a first splicing feature.

Step C3: processing the first splicing feature based on a fully connected layer, to obtain a first sub-feature required by a next decoder module of the decoder module.

Based on the first intermediate feature of the decoder module in the L−1$^{th}$ layer, the first sub-feature of the next decoder module is as shown in expression (3):

$$Q_c^L = MLP_{fuse}\left(\hat{Q}_c^{L-1} \| C^L\right) \tag{3}$$

Here, $C^L$ is the preset content calibration matrix, and $$\hat{Q}_c^{L-1}$$

is spliced with $C^L$ by (||) to obtain the first splicing feature; where L is also the number of the decoder module. Since the first splicing feature obtained may not be consistent with the original dimension of $$\hat{Q}_c^{L-1},$$

the fully connected layer (mlfuse) is used to fuse the first splicing feature back to the original dimension, to facilitate processing by the decoder module in the next layer.

In the embodiment of the present disclosure, the first intermediate feature of the previous layer is sorted with the help of the second fault classification result of the previous layer, and then the first sub-feature of this layer is adjusted based on the first intermediate feature and the preset content calibration matrix, so as to obtain the first sub-feature required for the decoder module in this layer with a more accurate description through optimized sorting.

As described above, the query vector further includes a second sub-feature; the second sub-feature is used to encode the location information of the fault; and the first sub-feature and the second sub-feature have the same number of elements.

For a decoder module including the query sorting layer, in order to keep the order of the second sub-features consistent with that of the sorted first sub-features, the second sub-features are sorted or recreated according to different DETR-based detectors.

In a possible implementation, for an H-DETR (hybrid matching approach) detector, the same second sub-features are used for the decoder modules in all the layers, and there is only a need to sort the second sub-features of the previous layer. The decoder module updates the second sub-feature of the decoder module based on the following method:

The update method of the second sub-feature of the decoder module is as shown in expression (4):

$$\hat{Q}_p^L = \mathrm{Sort}(Q_p^{L-1}; p^{L-1}) \tag{4}$$

Here, $p^{L-1}$ is the second fault classification result output by the decoder module in the L−1$^{th}$ layer, $$Q_p^{L-1}$$

is the second sub-feature of the decoder module in the L−1$^{th}$ layer; and $$\hat{Q}_p^L$$

is the second sub-feature required by the decoder module in the L$^{th}$ layer.

During implementation, still taking w detection frames as an example, the second sub-feature of the decoder module in the L−1$^{th}$ layer includes w elements, and each element in the second sub-feature of the decoder module in the L−1$^{th}$ layer corresponds to one detection frame. $p^{L-1}$ also includes w elements, each element corresponds to the fault classification result of one detection frame, and there are m preset fault types. The fault classification result of any detection frame is the probability distribution {m1, m2, . . . , mm} for each preset fault type, where m1 represents the probability that the detection frame belongs to the fault type 1; and m2 represents the probability that the detection frame belongs to the fault type 2. The maximum probability in the fault classification result of the detection frame is used to sort the elements corresponding to each detection frame in the second sub-feature of the decoder module in the L−1$^{th}$ layer in descending order, to obtain the second sub-feature of the decoder module in the L$^{th}$ layer.

In another possible implementation, for a DINO-DETR detector (DETR with Improved deNoising anchOr boxes), the decoder module updates the second sub-feature of the decoder module based on the following method:

Step D1: processing the second sub-feature of the decoder module in descending order based on the second fault classification result output by the decoder module, to obtain a second intermediate feature.

Here, the second intermediate feature of the decoder module in the L$^{th}$ layer is as shown in expression (5):

$$\hat{Q}_p^{L-1} = \mathrm{Sort}(Q_p^{L-1}; p^{L-1}) \tag{5}$$

Here, $p^{L-1}$ is the second fault classification result output by the decoder module in the L−1$^{th}$ layer;

$$Q_p^{L-1}$$

is the second sub-feature of the decoder module in the L−1$^{th}$ layer; and $$\hat{Q}_p^{L-1}$$

is the second intermediate feature.

During implementation, the specific sorting method is similar to the sorting method of the first sub-feature described above, and will not be described in detail in the embodiment of the present disclosure.

Step D2: reconstructing the second intermediate feature based on a sinusoidal position encoding function and a multi-layer perceptron, to obtain a second sub-feature required by a next decoder module of the decoder module.

The second sub-feature of the decoder module in the L$^{th}$ layer is as shown in expression (6):

$$\hat{Q}_p^L = PE(\hat{Q}_p^{L-1}) \tag{6}$$

Here, PE(•) is the sinusoidal position encoding function and a small multi-layer perceptron, and is used to re-perform position encoding on $$\hat{Q}_p^{L-1}$$

to obtain the second sub-feature $$\hat{Q}_p^L$$

of the decoder module in the L$^{th}$ layer.

During implementation, $$\hat{Q}_p^{L-1}$$

includes the coordinate information of each dot in each detection frame. The sine encoding method is used to perform position encoding on the coordinate information of each dot in the detection frame, which can be expressed as shown in the following formula (7):

$$PE(u, v, 2i) = \sin\left(\frac{u}{T^{\frac{4i}{D}}}\right), i = 0, 2, \ldots, D/2 \tag{7}$$

$$PE(u, v, 2i+1) = \cos\left(\frac{u}{T^{\frac{4i}{D}}}\right)$$

$$PE\left(u, v, \frac{D}{2} + 2i\right) = \sin\left(\frac{v}{T^{\frac{4i}{D}}}\right), i = 0, 2, \ldots, D/2$$

-continued $$PE\left(u, v, \frac{D}{2} + 2i + 1\right) = \cos\left(\frac{v}{T^{\frac{4i}{D}}}\right)$$

In formula (7), (u, v) represents the coordinate position of each dot in the detection frame in the image to be processed; D represents the encoding dimension required for the second sub-feature, and D is usually a given value; T is the modulation temperature, and may generally be 10000.

After the position encoding of formula (7), the updated second sub-feature can be obtained through processing by the multi-layer perceptron.

In the embodiment of the present disclosure, the second intermediate feature is reconstructed based on the sinusoidal position encoding function and the multi-layer perceptron, and the second sub-feature required by the next decoder module is obtained, thereby more accurately describe the detection frame of the fault object to facilitate subsequent processing.

In some embodiments, the use of the trained decoder network in the embodiments of the present disclosure has been explained above. In order to obtain a suitable decoder network, in an embodiment of the present disclosure, the classification calibration matrix of each decoder module in the decoder network is learnable and obtained by training the decoder network in the training process of the decoder network, which may be implemented as follows:

In the process of training the decoder network, the control of melt temperature in the spinning workshop is relatively important. The fault identification focuses more on the evaluation of the heat preservation effect of the heat preservation layer. The random initialization of the classification calibration matrix may be far from the ideal state. In order to accelerate the convergence of the model, the classification calibration matrix may be initialized based on the following method in the embodiment of the present disclosure:

Step H1: segmenting a sub-sample of a fault area from a thermal image sample collected by the process control device.

Step H2: initializing the classification calibration vector based on a difference between the sub-sample and sample data of the fault area in a normal working state.

In the embodiment of the present disclosure, the classification calibration vector is initialized based on the difference between the sub-sample and the sample data of the fault area in the normal working state, so that the initial state of the classification calibration vector can be expressed based on the temperature information of the heat preservation layer, so as to accelerate the convergence speed of the model training and help learn the available classification calibration vector as soon as possible.

3) Obtaining the Fault Detection Result

In some embodiments, as described above, the process control device includes a temperature control system, and the temperature control system includes a heating device and a melt distribution pipe. The detection for temperature may be implemented as follows:

Step E1: obtaining a thermal image of the temperature control system based on an infrared camera.

Step E2: for a target component of the temperature control system, extracting an image block of the target component from the thermal image.

Here, the target component is the melt distribution pipe or may be the heating device.

Step E3: obtaining difference information between the image block of the target component and a standard image block of the target component based on comparison of the image block of the target component with the standard image block of the target component.

The standard image block of the target component is the standard temperature range of the target component. The collected image block of the target component is compared with the standard temperature range of the target image to obtain the difference information therebetween. Specifically, the difference information may be expressed based on the statistical information of the difference between pixel values at the same pixel position. The statistical information is, for example, a mean value, a variance, etc. Moreover, the pre-trained model may also be used to extract the feature matrices of the collected image block and the standard temperature range of the target component respectively, and then the difference between the feature matrices is calculated to obtain the difference information.

Step E4: detecting whether a temperature of the target component is within a normal temperature range based on the difference information.

When the image block of the target component belongs to the standard temperature range of the target image, it is determined that the target component has no abnormality; when the image block of the target component does not belong to the standard temperature range of the target image, it is determined that the target component has an abnormality. The abnormal situation is determined in combination with the second fault classification result output by the last-layer decoder module of the decoder network in the fault detection result and the fault position output by the last-layer decoder module.

In an embodiment of the present disclosure, a thermal image of the target component is collected and compared with the standard image block of the target component to determine whether the temperature of the target component at that moment is normal.

In some embodiments, the second fault classification result in the fault detection result includes a fault type and a fault level, and the method may further be implemented as follows:

Step F1: generating a maintenance task when the fault detection result indicates that a fault occurs in a temperature control system of the process control device and the fault level is higher than a preset level, where the maintenance task includes an emergency degree of the maintenance task and the fault detection result.

Step F2: pushing the maintenance task to a target client.

For example, if it is detected that the heat preservation layer on the melt distribution pipe in the temperature control system is damaged too much (for example, the damage depth is greater than a preset depth, and the damage radius is greater than a preset radius) and the temperature of the heat preservation pipe has been affected (for example, an abnormality is found based on the thermal image), then the fault detection result is the highest risk and the timely treatment is needed. If it is detected that the heat preservation layer on the heat preservation pipe in the temperature control system is damaged too little and there is no effect on the temperature of the heat preservation pipe, then the fault detection result is the lower risk, and the maintenance task may be recorded firstly so that the staff can handle regularly.

In the embodiment of the present disclosure, different processing strategies are executed based on the emergency degree of the fault, and can be adaptively adjusted based on actual conditions.

In some embodiments, since there may be accumulation of engineering auxiliary materials in an open areas of the spinning workshop, it is necessary to perform image collection on the open area as well, which may be implemented as follows:

Step G1: performing image collection on an open area of the spinning box in the spinning workshop to obtain a target image.

Step G2: detecting accumulation of engineering auxiliary materials in the open area based on the target image, to obtain a detection result.

Still as shown in FIG. 3, the white dotted rectangular frame in FIG. 3 represents the engineering auxiliary materials.

Step G3: generating a detection record based on the detection result and a historical detection result of the open area.

When the detection result shows that there is accumulation of engineering auxiliary materials in the position coordinate 1, there are already two records of "there is accumulation of engineering auxiliary materials in the position coordinate 1" in the historical detection results, so this detection result continues to be recorded as the third record of "there is accumulation of engineering auxiliary materials in the position coordinate 1".

Step G4: matching the detection record with a reporting strategy set.

Here, the reporting strategy set is: when the same detection record appears once, reporting it to the first-level staff; when the same detection record appears twice, reporting it to the second-level staff; when the same detection record appears q times, reporting it to the $q^{th}$-level staff, and so on. The $q^{th}$-level manager is the superior of the $q-1^{th}$-level manager, and so on. The second-level manager is the superior of the first-level manager.

Step G5: generating alarm information based on a reporting strategy matched from the reporting strategy set.

In the embodiment of the present disclosure, the accumulation of engineering auxiliary materials corresponds to different reporting strategies, to avoid the situation where the staff forgets and to fill the loopholes in management.

Figure 7:
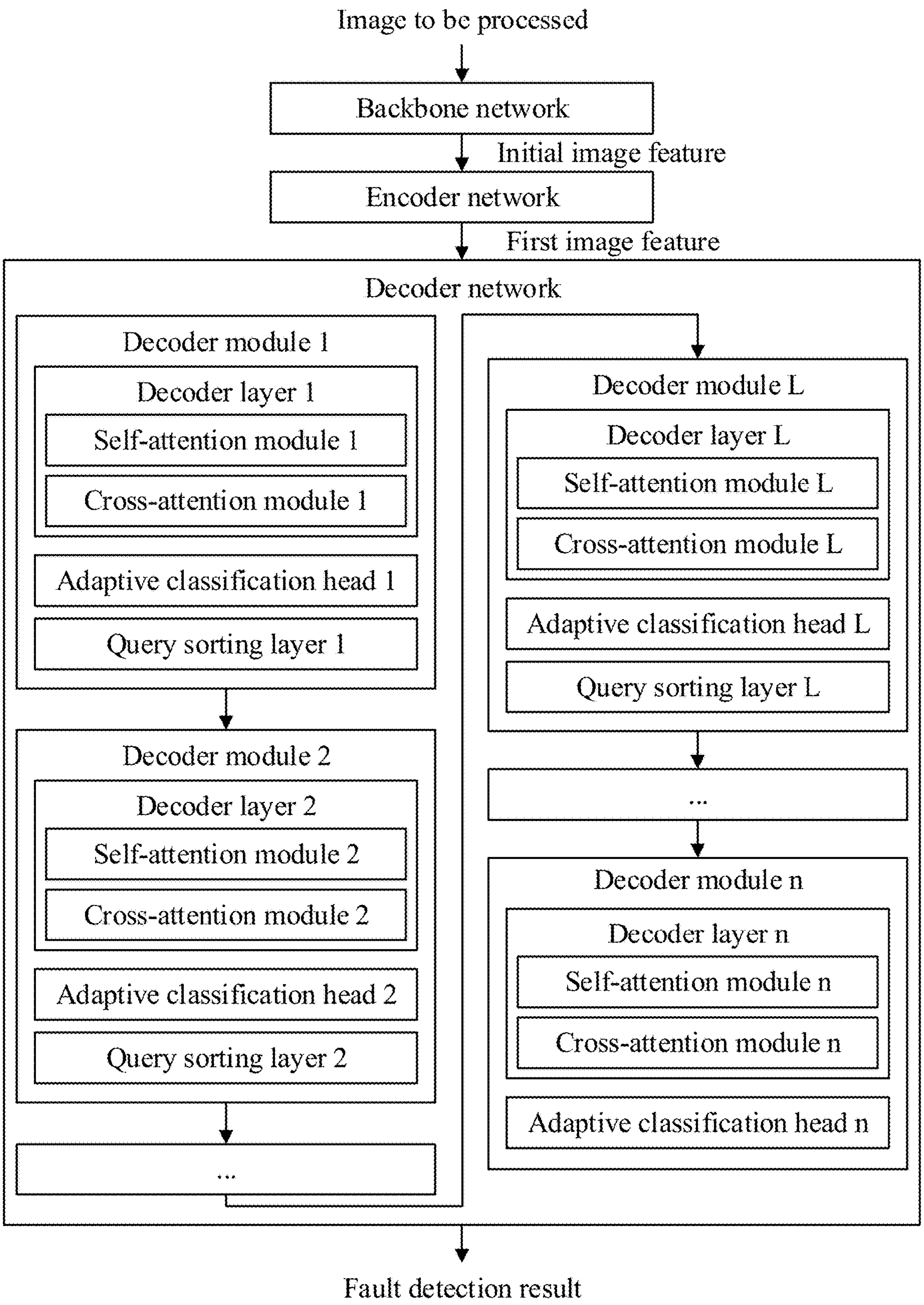
FIG. 7 is a schematic diagram of the overall framework of the detection method for the spinning workshop according to an embodiment of the present disclosure.

In summary, in a possible implementation, a network framework applicable to the detection method for the spinning workshop proposed in the embodiments of the present disclosure is shown in FIG. 7. The image to be processed is input into the backbone network to obtain the initial image feature; and the initial image feature is input into the encoder network to obtain the first image feature. The first image feature is input into the decoder network that includes n decoder modules.

In an embodiment of the present disclosure, the query vector is initialized to obtain Q°, the image to be processed is divided into a plurality of grids, and the position encoding is performed on each grid to obtain the target position encoding PE. The initialized query vector Q° and the target position encoding PE are fused and then used as the query vector Q of the self-attention module 1 in the first decoder module 1; and the target position encoding PE is used as K and V of the self-attention module 1 in the first decoder module 1. The output of the self-attention module 1 is a self-attention feature TE1.

The self-attention feature TE1 and the target position encoding PE are fused as Q of the cross-attention module 1 in the first decoder module 1, the first image feature is used as V of the cross-attention module 1, and the fusion feature of the first image feature and the preset position encoding CE (the position encoding may be position encoding of the camera, for example, position encoding of the camera in the inspection route) in the input of the encoder network is used as K of the cross-attention module 1.

For each subsequent decoder module L, Q, K and V of the self-attention module L are constructed based on the target position encoding PE and the updated Q of the previous decoder module. For example, K and V are both the target position encoding PE, and Q is Q updated based on the previous decoder module.

For each subsequent decoder module L, Q, K and V of the cross-attention module L are constructed based on the self-attention feature TEL, the first image feature and the preset position encoding. For example, Q is the self-attention feature TEL output by the self-attention module L; V is the first image feature; and K is the fusion feature of the first image feature and the preset position encoding.

During the processing, the final fault detection result and fault position are obtained after processing by each decoder layer, adaptive classification head and query sorting layer.

Figure 8:
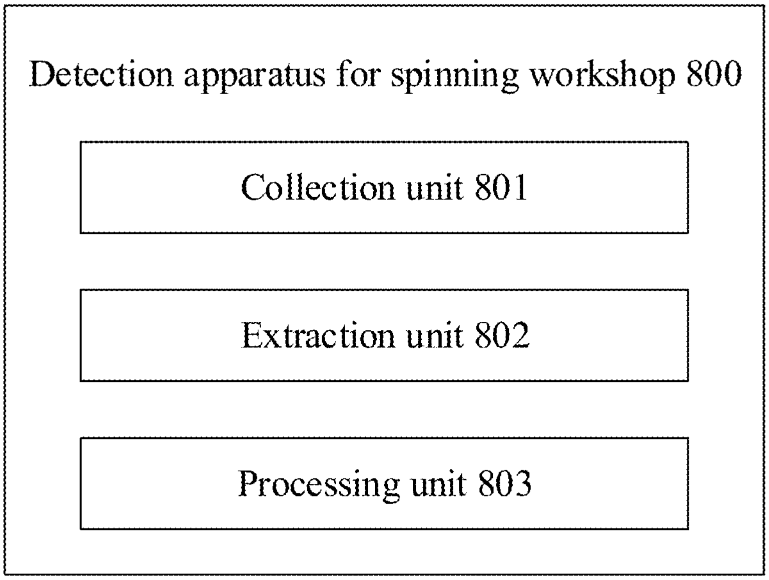
FIG. 8 is a structural schematic diagram of a detection apparatus for a spinning workshop according to an embodiment of the present disclosure.

Based on the same technical concept, an embodiment of the present disclosure further provides a detection apparatus 800 for a spinning workshop, as shown in FIG. 8, including:

a collection unit 801 configured to perform image collection on a process control device of a spinning box in the spinning workshop to obtain an image to be processed;

an extraction unit 802 configured to extract a first image feature from the image to be processed; and a processing unit 803 configured to process the first image feature based on a decoder network to obtain a fault detection result for the process control device;

where the decoder network includes a plurality of decoder modules connected in series in sequence;

for each decoder module: the decoder module includes a decoder layer and an adaptive classification head; and the adaptive classification head is configured to perform classified prediction on an output feature of the decoder layer to obtain a first fault classification result, and update the first fault classification result based on a preset classification calibration matrix to obtain a second fault classification result output by the decoder module; and the fault detection result output by the decoder network includes a second fault classification result output by a last-layer decoder module of the decoder network, and a fault position output by the last-layer decoder module.

In some embodiments, a query vector of each decoder module includes a first sub-feature, and the first sub-feature is used to capture semantic category information;

at least one decoder module other than a last decoder module in the decoder network further includes a query sorting layer; and the apparatus further includes:

a first updating unit configured to, for a decoder module including the query sorting layer, update the first sub-feature of the decoder module via the decoder module by:

processing a first element in the first sub-feature of the decoder module in descending order based on the second fault classification result output by the decoder module, to obtain a first intermediate feature;

splicing the first intermediate feature with a preset content calibration matrix to obtain a first splicing feature; and processing the first splicing feature based on a fully connected layer, to obtain a first sub-feature required by a next decoder module of the decoder module.

In some embodiments, the query vector of each decoder module further includes a second sub-feature; the second sub-feature is used to encode location information of a fault; and the first sub-feature and the second sub-feature have the same number of elements;

the apparatus further includes:

a second updating unit configured to, for a decoder module including the query sorting layer, update the second sub-feature of the decoder module via the decoder module by:

processing the second sub-feature of the decoder module in descending order based on the second fault classification result output by the decoder module, to obtain a second intermediate feature; and reconstructing the second intermediate feature based on a sinusoidal position encoding function and a multi-layer perceptron, to obtain a second sub-feature required by a next decoder module of the decoder module.

In some embodiments, the second fault classification result in the fault detection result includes a fault type and a fault level, and the apparatus further includes a pushing unit configured to:

generate a maintenance task when the fault detection result indicates that a fault occurs in a temperature control system of the process control device and the fault level is higher than a preset level, where the maintenance task includes an emergency degree of the maintenance task and the fault detection result; and push the maintenance task to a target client.

In some embodiments, the extraction unit is configured to:

input the image to be processed into a backbone network to obtain an initial image feature; and input the initial image feature into an encoder network to obtain the first image feature.

In some embodiments, the extraction unit is configured to:

input the image to be processed into an everything segmentation model to obtain a mask image of a target position;

generate a minimum rectangular bounding box to accommodate the mask image of the target position based on the mask image of the target position;

cut out a visible sub-image from the image to be processed based on the minimum rectangular bounding box, and cut out a thermal sub-image within the minimum rectangular bounding box from a thermal image with a same viewing range as the image to be processed;

input the visual sub-image into a backbone network to obtain a first sub-image feature;

input the first sub-image feature into an encoder network to obtain a sub-image feature to be fused;

extract a thermal feature from the thermal sub-image; and fuse the sub-image feature to be fused, the thermal feature, and a second sub-image feature extracted by the everything segmentation model from the minimum rectangular bounding box of the image to be processed, to obtain the first image feature.

In some embodiments, the process control device includes a temperature control system, and the apparatus further includes a temperature detection unit configured to:

obtain a thermal image of the temperature control system based on an infrared camera;

for a target component of the temperature control system, extract an image block of the target component from the thermal image;

obtain difference information between the image block of the target component and a standard image block of the target component based on comparison of the image block of the target component with the standard image block of the target component; and detect whether a temperature of the target component is within a normal temperature range based on the difference information.

In some embodiments, the apparatus further includes an alarm unit configured to: perform image collection on an open area of the spinning box in the spinning workshop to obtain a target image;

detect accumulation of engineering auxiliary materials in the open area based on the target image, to obtain a detection result;

generate a detection record based on the detection result and a historical detection result of the open area;

match the detection record with a reporting strategy set; and generate alarm information based on a reporting strategy matched from the reporting strategy set.

In some embodiments, the classification calibration matrix of each decoder module in the decoder network is learnable and obtained by training the decoder network, and the apparatus further includes an initialization unit configured to:

in a process of training the decoder network, initialize the classification calibration matrix by:

segmenting a sub-sample of a fault area from a thermal image sample collected by the process control device; and initializing the classification calibration vector based on a difference between the sub-sample and sample data of the fault area in a normal working state.

For the description of specific functions and examples of the modules and sub-modules\units of the apparatus of the embodiment of the present disclosure, reference may be made to the relevant description of the corresponding steps in the above-mentioned method embodiments, and details are not repeated here.

In the technical solution of the present disclosure, the acquisition, storage and application of the user's personal information involved are in compliance with relevant laws and regulations, and do not violate public order and good customs.

Figure 9:
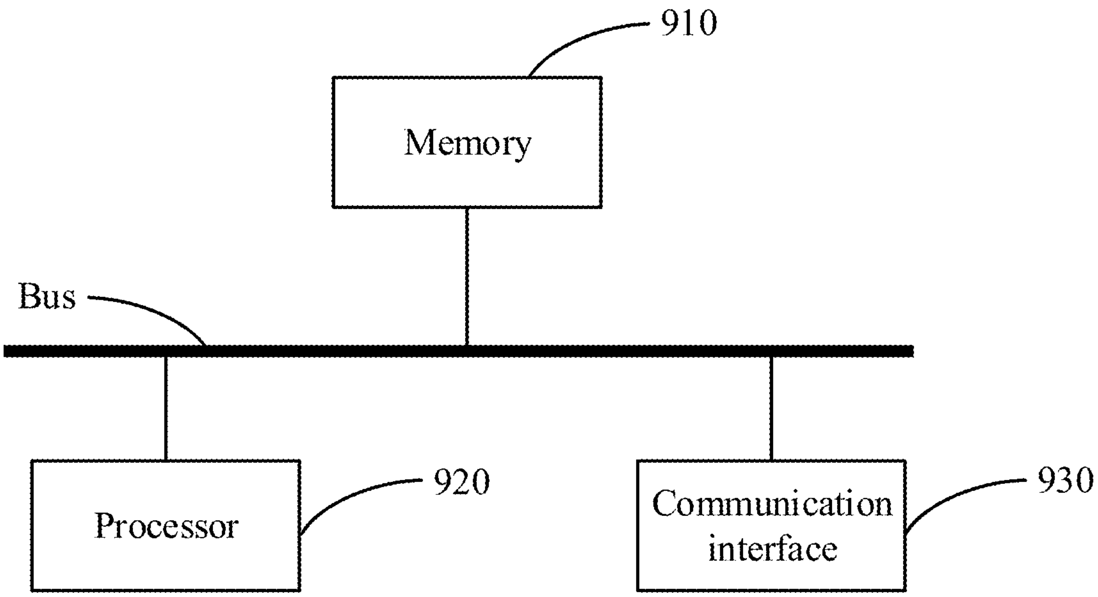
FIG. 9 is a block diagram of an electronic device used to implement the detection method for the spinning workshop according to an embodiment of the present disclosure.

FIG. 9 is a structural block diagram of an electronic device according to an embodiment of the present disclosure. As shown in FIG. 9, the electronic device includes: a memory 910 and a processor 920, and the memory 910 stores a computer program that can run on the processor 920. There may be one or more memories 910 and processors 920. The memory 910 may store one or more computer programs, and the one or more computer programs cause the electronic device to perform the method provided in the above method embodiment, when executed by the electronic device. The electronic device may also include: a communication interface 930 configured to communicate with an external device for data interactive transmission.

If the memory 910, the processor 920 and the communication interface 930 are implemented independently, the memory 910, the processor 920 and the communication interface 930 may be connected to each other and complete communication with each other through a bus. The bus may be an Industry Standard Architecture (ISA) bus, a Peripheral Component Interconnect (PCI) bus, or an Extended Industry Standard Architecture (EISA) bus, etc. The bus may be divided into address bus, data bus, control bus, etc. For ease of representation, the bus is represented by only one thick line in FIG. 9, but this thick line does not represent only one bus or only one type of bus.

Optionally, in a specific implementation, if the memory 910, the processor 920 and the communication interface 930 are integrated on one chip, the memory 910, the processor 920 and the communication interface 930 may communicate with each other through an internal interface.

It should be understood that the above-mentioned processor may be a Central Processing Unit (CPU) or other general-purpose processor, a Digital Signal Processor (DSP), an Application Specific Integrated Circuit (ASIC), a Field Programmable Gate Array (FPGA) or other programmable logic device, a discrete gate or transistor logic device, a discrete hardware component, etc. The general-purpose processor may be a microprocessor or any conventional processor, etc. It is worth noting that the processor may be a processor that supports the Advanced RISC Machines (ARM) architecture.

Further, optionally, the above-mentioned memory may include a read-only memory and a random access memory, and may also include a non-volatile random access memory. The memory may be a volatile memory or a non-volatile memory, or may include both a volatile memory and a non-volatile memory. Here, the non-volatile memory may include a Read-Only Memory (ROM), a Programmable ROM (PROM), an Erasable PROM (EPROM), an Electrically EPROM (EEPROM) or a flash memory. The volatile memory may include a Random Access Memory (RAM), which acts as an external cache. By way of illustration and not limitation, many forms of RAMs are available, for example, Static RAM (SRAM), Dynamic Random Access Memory (DRAM), Synchronous DRAM (SDRAM), Double Data Date SDRAM (DDR SDRAM), Enhanced SDRAM (ESDRAM), Synchlink DRAM (SLDRAM) and Direct RAMBUS RAM (DR RAM).

The above embodiments may be implemented in whole or in part by software, hardware, firmware or any combination thereof. When implemented by software, they may be implemented in the form of a computer program product in whole or in part. The computer program product includes one or more computer instructions. When the computer instructions are loaded and executed on a computer, the processes or functions described in the embodiments of the present disclosure are generated in whole or in part. The computer may be a general-purpose computer, a special-purpose computer, a computer network, or other programmable device. The computer instructions may be stored in a computer readable storage medium or transmitted from a computer readable storage medium to another computer readable storage medium. For example, the computer instructions may be transmitted from a website, computer, server or data center to another website, computer, server or data center in a wired (e.g., coaxial cable, optical fiber, Digital Subscriber Line (DSL)) or wireless (e.g., infrared, Bluetooth, microwave, etc.) way. The computer readable storage medium may be any available medium that can be accessed by a computer, or a data storage device such as server or data center that is integrated with one or more available media. The available media may be magnetic media (for example, floppy disk, hard disk, magnetic tape), optical media (for example, Digital Versatile Disc (DVD)), or semiconductor media (for example, Solid State Disk (SSD)), etc. It is worth noting that the computer readable storage medium mentioned in the present disclosure may be a non-volatile storage medium, in other words, may be a non-transitory storage medium.

Those having ordinary skill in the art can understand that all or some of the steps for implementing the above embodiments may be completed by hardware, or may be completed by instructing related hardware through a program. The program may be stored in a computer readable storage medium. The above-mentioned storage medium may be a read-only memory, a magnetic disk or an optical disk, etc.

In the description of the embodiments of the present disclosure, the description with reference to the terms "one embodiment", "some embodiments", "example", "specific example" or "some examples", etc. means that specific features, structures, materials or characteristics described in conjunction with the embodiment or example are included in at least one embodiment or example of the present disclosure. Moreover, the specific features, structures, materials or characteristics described may be combined in a suitable manner in any one or more embodiments or examples. In addition, those skilled in the art can integrate and combine different embodiments or examples and features of different embodiments or examples described in this specification without conflicting with each other.

In the description of the embodiments of the present disclosure, "/" represents or, unless otherwise specified. For example, A/B may represent A or B. The term "and/or" herein only describes an association relation of associated objects, which indicates that there may be three kinds of relations, for example, A and/or B may indicate that only A exists, or both A and B exist, or only B exists.

In the description of the embodiments of the present disclosure, the terms "first" and "second" are only for purpose of description, and cannot be construed to indicate or imply the relative importance or implicitly point out the number of technical features indicated. Therefore, the feature defined with "first" or "second" may explicitly or implicitly include one or more features. In the description of the embodiments of the present disclosure, "multiple" means two or more, unless otherwise specified.

The above descriptions are only exemplary embodiments of the present disclosure and not intended to limit the present disclosure. Any modifications, equivalent replacements, improvements and others made within the spirit and principle of the present disclosure shall be contained in the protection scope of the present disclosure.

What is claimed is:

1. A detection method for temperature control of a heat preservation layer included in a process control device of a spinning box in a spinning workshop, comprising:

performing image collection on the process control device of the spinning box in the spinning workshop to obtain an image to be processed;

extracting a first image feature from the image to be processed, comprising:

inputting the image to be processed into an everything segmentation model to obtain a mask image of a target position, said target position being a damaged position in the heat preservation layer;

generating a minimum rectangular bounding box to accommodate the mask image of the target position based on the mask image of the target position;

cutting out a visible sub-image from the image to be processed based on the minimum rectangular bounding box, and cutting out a thermal sub-image within the minimum rectangular bounding box from a thermal image with a same viewing range as the image to be processed;

inputting the visible sub-image into a backbone network to obtain a first sub-image feature;

inputting the first sub-image feature into an encoder network to obtain a sub-image feature to be fused;

extracting a thermal feature from the thermal sub-image; and fusing the sub-image feature to be fused, the thermal feature, and a second sub-image feature extracted by the everything segmentation model from the minimum rectangular bounding box of the image to be processed, to obtain the first image feature; and processing the first image feature based on a decoder network to obtain a fault detection result for the process control device, wherein the fault detection result output by the decoder network comprises a fault classification result and a fault position output by the decoder network.

2. The method of claim 1, wherein the decoder network comprises a plurality of decoder modules connected in series in sequence, for each decoder module after a first decoder module in the decoder network, an output feature of a previous decoder module of the decoder module is taken as an input feature of the decoder module;

wherein each decoder module comprises a decoder layer and an adaptive classification head; and the adaptive classification head is configured to perform classified prediction on an output feature of the decoder layer to obtain a first fault classification result, and update the first fault classification result based on a preset classification calibration matrix to obtain a second fault classification result output by the decoder module;

wherein the fault detection result output by the decoder network comprises a second fault classification result output by a last-layer decoder module of the decoder network, and a fault position output by the last-layer decoder module.

3. The method of claim 2, wherein a query vector of each decoder module comprises a first sub-feature, and the first sub-feature is used to capture semantic category information;

at least one decoder module other than a last decoder module in the decoder network further comprises a query sorting layer;

for a decoder module comprising the query sorting layer, the decoder module updates the first sub-feature of the decoder module by:

processing a first element in the first sub-feature of the decoder module in descending order based on the second fault classification result output by the decoder module, to obtain a first intermediate feature;

splicing the first intermediate feature with a preset content calibration matrix to obtain a first splicing feature; and processing the first splicing feature based on a fully connected layer, to obtain a first sub-feature required by a next decoder module of the decoder module.

4. The method of claim 3, wherein the query vector of each decoder module further comprises a second sub-feature; the second sub-feature is used to encode location information of a fault; the first sub-feature and the second sub-feature have the same number of elements; and the method further comprises:

for a decoder module comprising the query sorting layer, the decoder module updates the second sub-feature of the decoder module by:

processing the second sub-feature of the decoder module in descending order based on the second fault classification result output by the decoder module, to obtain a second intermediate feature; and reconstructing the second intermediate feature based on a sinusoidal position encoding function and a multi-layer perceptron, to obtain a second sub-feature required by a next decoder module of the decoder module.

5. The method of claim 2, wherein the second fault classification result in the fault detection result comprises a fault type and a fault level, and the method further comprises:

generating a maintenance task responsive to the fault detection result indicating that a fault occurs in a temperature control system of the process control device and the fault level is higher than a preset level, wherein the maintenance task comprises an emergency degree of the maintenance task and the fault detection result; and pushing the maintenance task to a target client.

6. The method of claim 2, wherein the extracting a first image feature from the image to be processed, comprises:

inputting the image to be processed into a backbone network to obtain an initial image feature; and inputting the initial image feature into an encoder network to obtain the first image feature.

7. The method of claim 1, wherein the process control device further comprises a temperature control system, and the method further comprises:

obtaining a thermal image of the temperature control system based on an infrared camera;

for a target component of the temperature control system, extracting an image block of the target component from the thermal image, wherein the target component is wrapped with the heat preservation layer;

obtaining difference information between the image block of the target component and a standard image block of the target component based on comparison of the image block of the target component with the standard image block of the target component; and detecting whether a temperature of the target component is within a normal temperature range based on the difference information.

8. The method of claim 1, further comprising:

performing image collection on an open area of the spinning box in the spinning workshop to obtain a target image;

detecting accumulation of engineering auxiliary materials in the open area based on the target image, to obtain a detection result;

generating a detection record based on the detection result and a historical detection result of the open area;

matching the detection record with a reporting strategy set; and generating alarm information based on a reporting strategy matched from the reporting strategy set.

9. The method of claim 2, wherein the classification calibration matrix of each decoder module in the decoder network is learnable and obtained by training the decoder network, and the method further comprises:

in a process of training the decoder network, initializing the classification calibration matrix by:

segmenting a sub-sample of a fault area from a thermal image sample collected by the process control device; and initializing a classification calibration vector based on a difference between the sub-sample and sample data of the fault area in a normal working state.

10. An electronic device, comprising:

at least one processor; and a memory connected in communication with the at least one processor;

wherein the memory stores instructions executable by the at least one processor, and the instructions, when executed by the at least one processor, enable the at least one processor to execute a method comprising:

performing image collection on a process control device of a spinning box in a spinning workshop to obtain an image to be processed;

extracting a first image feature from the image to be processed, comprising:

inputting the image to be processed into an everything segmentation model to obtain a mask image of a target position, said target position being a damaged position in a heat preservation layer included in the process control device of the spinning box in the spinning workshop;

generating a minimum rectangular bounding box to accommodate the mask image of the target position based on the mask image of the target position;

cutting out a visible sub-image from the image to be processed based on the minimum rectangular bounding box, and cutting out a thermal sub-image within the minimum rectangular bounding box from a thermal image with a same viewing range as the image to be processed;

inputting the visible sub-image into a backbone network to obtain a first sub-image feature;

inputting the first sub-image feature into an encoder network to obtain a sub-image feature to be fused;

extracting a thermal feature from the thermal sub-image; and fusing the sub-image feature to be fused, the thermal feature, and a second sub-image feature extracted by the everything segmentation model from the minimum rectangular bounding box of the image to be processed, to obtain the first image feature; and processing the first image feature based on a decoder network to obtain a fault detection result for the process control device, wherein the fault detection result output by the decoder network comprises a fault classification result and a fault position output by the decoder network.

11. The electronic device of claim 10, wherein the decoder network comprises a plurality of decoder modules connected in series in sequence, for each decoder module after a first decoder module in the decoder network, an output feature of a previous decoder module of the decoder module is taken as an input feature of the decoder module;

wherein each decoder module comprises a decoder layer and an adaptive classification head; and the adaptive classification head is configured to perform classified prediction on an output feature of the decoder layer to obtain a first fault classification result, and update the first fault classification result based on a preset classification calibration matrix to obtain a second fault classification result output by the decoder module;

wherein the fault detection result output by the decoder network comprises a second fault classification result output by a last-layer decoder module of the decoder network, and a fault position output by the last-layer decoder module.

12. The electronic device of claim 11, wherein a query vector of each decoder module comprises a first sub-feature, and the first sub-feature is used to capture semantic category information;

at least one decoder module other than a last decoder module in the decoder network further comprises a query sorting layer;

for a decoder module comprising the query sorting layer, the decoder module updates the first sub-feature of the decoder module by:

processing a first element in the first sub-feature of the decoder module in descending order based on the second fault classification result output by the decoder module, to obtain a first intermediate feature;

splicing the first intermediate feature with a preset content calibration matrix to obtain a first splicing feature; and processing the first splicing feature based on a fully connected layer, to obtain a first sub-feature required by a next decoder module of the decoder module.

13. The electronic device of claim 12, wherein the query vector of each decoder module further comprises a second sub-feature; the second sub-feature is used to encode location information of a fault; the first sub-feature and the second sub-feature have the same number of elements; and the method further comprises:

for a decoder module comprising the query sorting layer, the decoder module updates the second sub-feature of the decoder module by:

processing the second sub-feature of the decoder module in descending order based on the second fault classification result output by the decoder module, to obtain a second intermediate feature; and reconstructing the second intermediate feature based on a sinusoidal position encoding function and a multi-layer perceptron, to obtain a second sub-feature required by a next decoder module of the decoder module.

14. The electronic device of claim 11, wherein the second fault classification result in the fault detection result comprises a fault type and a fault level, and the method further comprises:

generating a maintenance task responsive to the fault detection result indicating that a fault occurs in a temperature control system of the process control device and the fault level is higher than a preset level, wherein the maintenance task comprises an emergency degree of the maintenance task and the fault detection result; and pushing the maintenance task to a target client.

15. The electronic device of claim 11, wherein the extracting a first image feature from the image to be processed, comprises:

inputting the image to be processed into a backbone network to obtain an initial image feature; and inputting the initial image feature into an encoder network to obtain the first image feature.

16. A non-transitory computer-readable storage medium storing computer instructions thereon, wherein the computer instructions are used to cause a computer to execute a method comprising:

performing image collection on a process control device of a spinning box in a spinning workshop to obtain an image to be processed;

extracting a first image feature from the image to be processed, comprising:

inputting the image to be processed into an everything segmentation model to obtain a mask image of a target position, said target position being a damaged position in a heat preservation layer included in the process control device of the spinning box in the spinning workshop;

generating a minimum rectangular bounding box to accommodate the mask image of the target position based on the mask image of the target position;

cutting out a visible sub-image from the image to be processed based on the minimum rectangular bounding box, and cutting out a thermal sub-image within the minimum rectangular bounding box from a thermal image with a same viewing range as the image to be processed;

inputting the visible sub-image into a backbone network to obtain a first sub-image feature;

inputting the first sub-image feature into an encoder network to obtain a sub-image feature to be fused;

extracting a thermal feature from the thermal sub-image; and fusing the sub-image feature to be fused, the thermal feature, and a second sub-image feature extracted by the everything segmentation model from the minimum rectangular bounding box of the image to be processed, to obtain the first image feature, wherein a fault detection result output by a decoder network comprises a fault classification result and a fault position output by the decoder network.

17. The non-transitory computer-readable storage medium of claim 16, wherein the decoder network comprises a plurality of decoder modules connected in series in sequence, for each decoder module after a first decoder module in the decoder network, an output feature of a previous decoder module of the decoder module is taken as an input feature of the decoder module;

wherein each decoder module comprises a decoder layer and an adaptive classification head; and the adaptive classification head is configured to perform classified prediction on an output feature of the decoder layer to obtain a first fault classification result, and update the first fault classification result based on a preset classification calibration matrix to obtain a second fault classification result output by the decoder module;

wherein the fault detection result output by the decoder network comprises a second fault classification result output by a last-layer decoder module of the decoder network, and a fault position output by the last-layer decoder module.

18. The non-transitory computer-readable storage medium of claim 17, wherein a query vector of each decoder module comprises a first sub-feature, and the first sub-feature is used to capture semantic category information;

at least one decoder module other than a last decoder module in the decoder network further comprises a query sorting layer;

for a decoder module comprising the query sorting layer, the decoder module updates the first sub-feature of the decoder module by:

processing a first element in the first sub-feature of the decoder module in descending order based on the second fault classification result output by the decoder module, to obtain a first intermediate feature;

splicing the first intermediate feature with a preset content calibration matrix to obtain a first splicing feature; and processing the first splicing feature based on a fully connected layer, to obtain a first sub-feature required by a next decoder module of the decoder module.

19. The non-transitory computer-readable storage medium of claim 18, wherein the query vector of each decoder module further comprises a second sub-feature; the second sub-feature is used to encode location information of a fault; the first sub-feature and the second sub-feature have the same number of elements; and the method further comprises:

for a decoder module comprising the query sorting layer, the decoder module updates the second sub-feature of the decoder module by:

processing the second sub-feature of the decoder module in descending order based on the second fault classification result output by the decoder module, to obtain a second intermediate feature; and reconstructing the second intermediate feature based on a sinusoidal position encoding function and a multi-layer perceptron, to obtain a second sub-feature required by a next decoder module of the decoder module.

20. The non-transitory computer-readable storage medium of claim 17, wherein the second fault classification result in the fault detection result comprises a fault type and a fault level, and the method further comprises:

generating a maintenance task responsive to the fault detection result indicating that a fault occurs in a temperature control system of the process control device and the fault level is higher than a preset level, wherein the maintenance task comprises an emergency degree of the maintenance task and the fault detection result; and pushing the maintenance task to a target client.

* * * * *